UNITED STATES PATENT OFFICE.

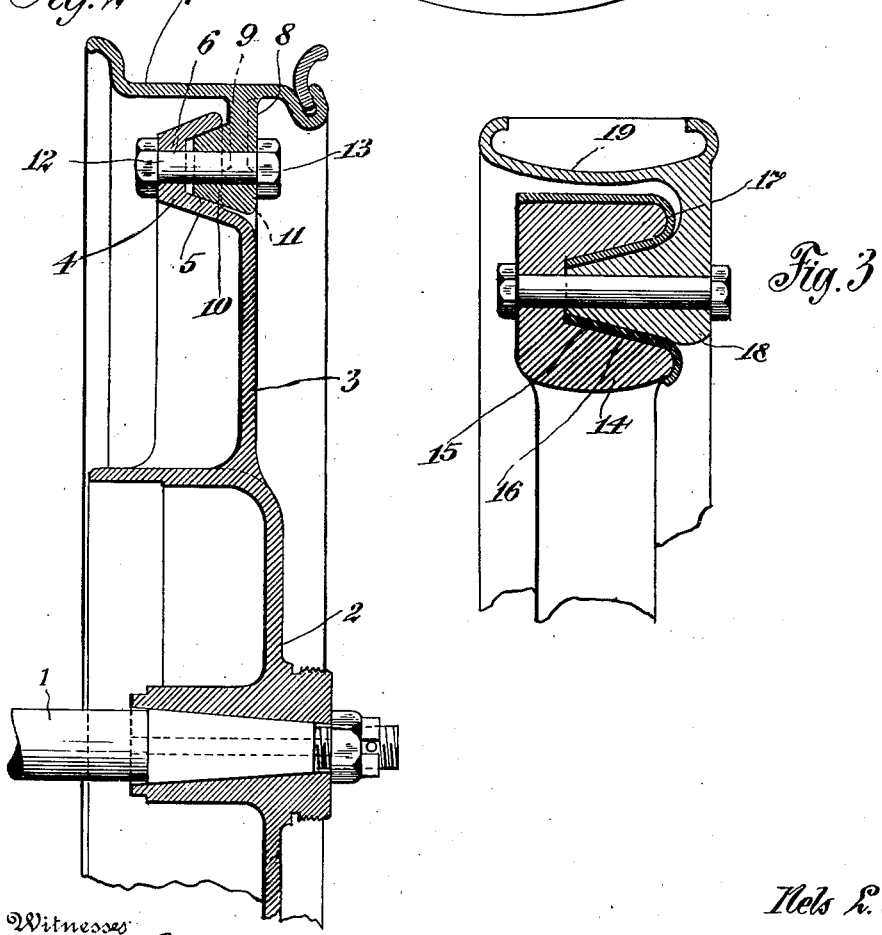

NELS L. OLSON, OF DETROIT, MICHIGAN.

DEMOUNTABLE RIM FOR VEHICLE-WHEELS.

1,213,241. Specification of Letters Patent. Patented Jan. 23, 1917.

Application filed May 1, 1916. Serial No. 94,550.

*To all whom it may concern:*

Be it known that I, NELS L. OLSON, a citizen of the United States of America, residing at Detroit, in the county of Wayne and State of Michigan, have invented certain new and useful Improvements in Demountable Rims for Vehicle-Wheels, of which the following is a specification, reference being had therein to the accompanying drawings.

Trucks used by punitive expeditions or for other military purposes require wheels that will permit of the trucks being operated at considerable speed, when necessary, and at other times wheels of great tractive power, therefore, a wheel which may be converted from a speed wheel to a tractor wheel and is readily changed back to a speed wheel, is a desideratum for vehicles used for military and other purposes. Such a wheel I have devised and an important feature of the same is a demountable rim that may be easily and quickly attached to the spokes of a wheel. The rim may have a pneumatic tire for high speed and light loads, a solid tire for tractor purposes or any type of tire,—and in either instance the load is distributed to the spokes of the wheel independent of certain connections between the rim and the spokes.

Another feature of my invention is the fastening means connecting the demountable rim to the spokes of the wheel or a felly thereof. The fastening means embodies spoke sockets and rim studs that may be easily placed in the sockets, the sockets and studs being designed to relieve the connecting means of the sockets and studs from any stresses or strains, also, to insure a connection irrespective of any small manufacturing inequalities between the ends of spokes and the rim to be attached thereto.

Other features of my invention will hereinafter appear, and reference will now be had to the drawing, wherein—

Figure 1 is a side elevation of a portion of a wheel provided with a demountable rim in accordance with my invention; Fig. 2 is an enlarged cross sectional view of a portion of a wheel, and Fig. 3 is a similar view illustrating the demountable rim connected to a felly of a wheel.

In describing my invention by aid of the views above referred to, I desire to point out that the same are merely illustrative of one of the wheels as now constructed, and I do not care to limit my invention to the precise construction and arrangement of parts shown. The following description is therefore to be broadly construed as including substitute constructions and arrangement of parts which are the obvious equivalent of those to be hereinafter referred to.

In the drawing, 1 denotes the end of an axle or driven wheel shaft and on the end of said axle is the hub portion 2 of the wheel, said hub portion having radiating spokes 3. The spokes 3 are preferably channel shaped in cross section and the outer ends thereof are formed with conical sockets 4 providing conical seats 5 open at the outer sides of the wheel. The sockets 4 are of a less depth than the width of the spokes 3 whereby the open ends of the sockets or seats will be set in from the outer sides of the spokes 3, as best shown in Fig. 2. Each socket has the inner end or bottom thereof provided with an opening 6 to receive a rim connecting means, to be hereinafter referred to.

7 denotes a rim adapted for holding a solid, pneumatic or any type of tire for the wheel. Adjacent the outer edge of the rim 7 are spaced inwardly projecting arms 8 braced by side webs or fillets 9 and the inner end of each arm has a conical stud 10 projecting at right angles thereto and intersecting the vertical central plane of the wheel. The conical studs 10 are adapted to extend into the conical sockets 4 of the spokes 3, and engage on the seats 5 of said sockets. The taper of the walls of the sockets 4 and the studs 10 is such that the inner ends of the studs 10 cannot engage the inner ends of the socket 4, consequently it is possible to forcibly enter the studs in the sockets until positively seated therein. The studs 10 are provided with openings 11 adapted to aline with the openings 6 of the sockets 4, and bolts 12 and nuts 13 can be conveniently used as a connecting means between the sockets and the studs. With the studs in the sockets 4, the outer sides of the arms 8 are in a plane with the outer sides of the spokes 3 and said arms are braced by the large and open ends of the sockets. This manner of articulating the arms 8 and the spokes 3 relieves the bolts 12 of any stresses or strains, as the studs 10 bear directly upon the seats 5 and coöperate with the spokes 3 in providing radial supports for the rim 7.

The bolts 12 and the nuts 13, constituting the connecting means between the spokes 3 and the rim 7, simply prevent lateral displacement of the rim 7 relative to the hub of the wheel and any outward sidewise or lateral movement of the chassis of a vehicle tends to tighten or more thoroughly seat the studs 10 relative to the sockets 4, when one wheel receives a greater side thrust than another. I am not aware of any vehicle wheel having a rim fastening means that tends to become more secure by an outward side thrust of the wheel, therefore consider the design of the sockets 4 and the studs 10 as an important feature of my wheel.

The same rim fastening means is applicable to a wheel having a felly 14, as shown in Fig. 3. It is only necessary to provide the outer side felly 14 with conical recesses 15 to receive conical socket portions 16 of an outer side plate or plates 17 mounted upon the felly 14. The socket portions 16 may form part of a fixed rim on the felly 14 and said socket portions are adapted to receive studs 18 of a demountable rim 19, said studs being held in a manner similar to the studs 10.

What I claim is:—

In a vehicle wheel, channel spokes having conical sockets at the outer end thereof of less depth than the width of said spokes, a demountable rim, inwardly projecting arms carried thereby, conical studs on said arms adapted to wedge in the conical sockets of said spokes by side thrusts of said spokes, said arms having the outer faces thereof in a plane with the outer sides of said spokes, and means extending through said spoke sockets, and said rim studs for holding said rim studs in said spoke sockets.

In testimony whereof I affix my signature in the presence of two witnesses.

NELS L. OLSON.

Witnesses:
 LEWIS E. FLANDERS,
 ANNA M. DORR.